(12) United States Patent
Takato

(10) Patent No.: US 7,680,980 B2
(45) Date of Patent: Mar. 16, 2010

(54) IMAGE FORMING APPARATUS

(75) Inventor: Jun Takato, Numazu (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 1251 days.

(21) Appl. No.: 11/203,070

(22) Filed: Aug. 12, 2005

(65) Prior Publication Data
US 2007/0035769 A1 Feb. 15, 2007

(51) Int. Cl.
*G06F 12/00* (2006.01)
(52) U.S. Cl. ...................... 711/112; 711/113
(58) Field of Classification Search ................. 711/112
See application file for complete search history.

(56) References Cited

U.S. PATENT DOCUMENTS 6,907,500 B2 * 6/2005 Suzuki et al. ............... 711/114
7,120,729 B2 * 10/2006 Gonzalez et al. ............ 711/103

FOREIGN PATENT DOCUMENTS

JP 10-40176 2/1998
JP 2001-325076 11/2001

* cited by examiner

*Primary Examiner*—Hong Kim
*Assistant Examiner*—Ngoc V Dinh
(74) *Attorney, Agent, or Firm*—Patterson & Sheridan, LLP

(57) ABSTRACT

An image forming apparatus includes a scanner, a hard disk drive in which a region at which data is stored is divided into a plurality of regions by partitions, a pointer setting unit in which a first pointer for storing image data generated on the basis of an image read by the scanner at one region of the plurality of regions, and a plurality of second pointers which are provided so as to correspond to the regions other than the region in order to store data other than the image data at regions other than the region are set, and a pointer replacing unit configured to replace the first pointer with one pointer of the plurality of second pointers in predetermined timings.

13 Claims, 10 Drawing Sheets

| Partitions | Pointers |
|---|---|
| Partition P1 | Pointer P1 |
| Partition P2 | Pointer P2 |
| Partition P3 | Pointer P3 |

FIG. 3

| Partitions | Pointers |
|---|---|
| Partition P1 | Pointer P2 |
| Partition P2 | Pointer P1 |
| Partition P3 | Pointer P3 |

FIG. 7

| ID | Name | Value | Threshold | Worst |
|----|------|-------|-----------|-------|
| 03 | Spin Up Time | 205 | 63 | 204 |
| 04 | Start/Stop Count | 253 | 0 | 253 |
| 05 | Reallocated Sector Count | 253 | 63 | 253 |
| 06 | Read Channel Margin | 253 | 100 | 253 |
| 07 | Seek Error Rate | 253 | 0 | 252 |
| 08 | Seek Time Performance | 250 | 187 | 249 |
| 09 | Power On Hours Count | 253 | 0 | 253 |
| 0A | Spin Retry Count | 253 | 157 | 252 |
| 0B | Calibration Retry Count | 253 | 223 | 252 |
| 0C | Power Cycle Count | 253 | 0 | 253 |
| C0 | Power off Retract Count | 253 | 0 | 253 |
| C1 | Load/Unload Cycle Count | 253 | 0 | 253 |
| C3 | Temperature | 253 | 0 | 253 |

Maxtor 6Y160P0, 134.2 GB; [Serial: Y44HJCVE] S.M.A.R.T. enabled

FIG. 5

| Partitions | Indexes | Pointers |
| --- | --- | --- |
| Partition P1 | 0 | Pointer P1 |
| Partition P2 | 0 | Pointer P2 |
| Partition P3 | 0 | Pointer P3 |
| Partition P4 | 0 | Pointer P4 |
| Partition P5 | No index | Pointer P5 |

FIG. 10

| Partitions | Indexes | Pointers |
| --- | --- | --- |
| Partition P1 | 1 | Pointer P2 |
| Partition P2 | 0 | Pointer P1 |
| Partition P3 | 0 | Pointer P3 |
| Partition P4 | 0 | Pointer P4 |
| Partition P5 | No index | Pointer P5 |

FIG. 13

IMAGE FORMING APPARATUS

BACKGROUND OF THE INVENTION

1. Field of the Invention

The present invention relates to an image forming apparatus having a hard disk drive in which a plurality of regions at which data are stored are provided by using partitions.

2. Description of the Related Art

In a hard disk drive (hereinafter, HDD) mounted on an image forming apparatus, for example, a copying machine, there are a single or a plurality of partitions used for changing an image, and a single or a plurality of partitions for storing other data.

With respect to respective data, read/write of data are carried out in partitions corresponding to the respective data. The reason for that a HDD is divided into many partitions is that limitations on using capacities are physically put so as to limit to a certain function or a certain intended use. Further this is from the viewpoint of security.

In accordance with a constitution in which many partitions are provided in this way, differences are brought about in the frequencies in use among the partitions in the course of continuing to use a copying machine. Scanned image data is converted into a digital image, and thereafter, is written into a partition corresponding thereto. The image data is read for printing from the partition into which the data has been written. From the characteristic of a copying machine, a frequency in use of a partition in which printing related data is handled is much higher than that of other partitions. For example, as compared with operations in which addresses are registered with an address book and the addresses are referred to, write operations and read operations of a partition in which printing related data is handled are frequent. Therefore, due to repeated use over the years, a deterioration of a partition with a high frequency in use progresses faster than that of other partitions. A deteriorated partition causes a failure, which affects an entire HDD, and all the data in the HDD may be lost in some cases.

Accordingly, there are needs for an image forming apparatus which can extend the life of an HDD and prevent data recorded in the HDD from being lost.

BRIEF SUMMARY OF THE INVENTION

According to an aspect of the present invention, there is provided an image forming apparatus comprising: a scanner; a hard disk drive in which a region at which data is stored is divided into a plurality of regions by using partitions; a pointer setting unit in which a first pointer for storing image data generated on the basis of an image read by the scanner at one region of the plurality of regions, and a plurality of second pointers which are provided so as to correspond to the regions other than the region in order to store data other than the image data at regions other than the region are set; and a pointer replacing unit configured to replace the first pointer with two pointers among the plurality of second pointers in predetermined timings.

Objects and advantages of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

FIG. 3 is a table showing settings for pointers corresponding to partitions in the embodiment;

FIG. 5 is a diagram showing one example of a screen for checking a status of the HDD in the embodiment;

FIG. 7 is a table showing settings for pointers after carrying out the processing for replacing pointers in the embodiment;

FIG. 10 is a table showing settings for indexes and pointers provided in accordance with the partitions in the embodiment;

FIG. 13 is a table showing settings for indexes and pointers provided in accordance with the partitions when 1 is added to an index in the embodiment;

DETAILED DESCRIPTION OF THE INVENTION

Hereinafter, respective embodiments of the present invention will be described with reference to the drawings.

First Embodiment

Figure 1:
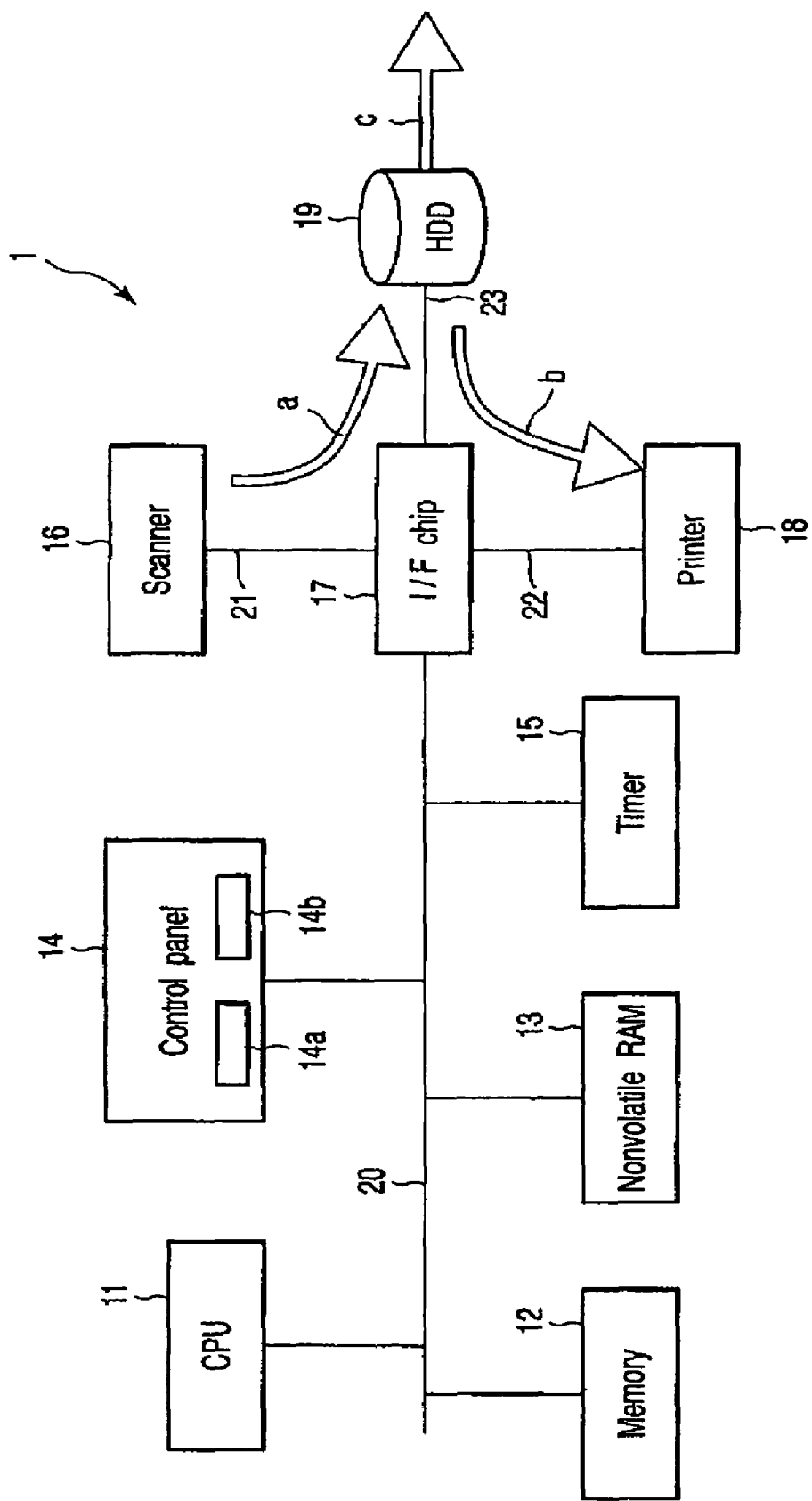
FIG. 1 is a block diagram showing a principal constitution of a copying machine in a first embodiment.

FIG. 1 is a block diagram showing a principal constitution of a copying machine 1 which is an image forming apparatus. As shown in FIG. 1, the copying machine 1 has a CPU 11, a memory 12, a nonvolatile RAM 13, a control panel 14, a timer 15, a scanner 16, an interface (I/F) chip 17, a printer 18, and a HDD 19. Further, the CPU 11, the memory 12, the nonvolatile RAM 13, the control panel 14, the timer 15, and the I/F chip 17 are connected via a bus line 20. Further, the I/F chip 17 is connected to the scanner 16, the printer 18, and the HDD 19 via bus lines 21, 22, and 23, respectively.

The CPU 11 controls the entire copying machine 1 by executing a control program stored in the memory 12. The memory 12 stores the control program which the CPU 11 executes. The nonvolatile RAM 13 has a work area needed when the CPU 11 executes the control program stored in the memory 12, and stores various data.

The control panel 14 has an operation unit 14a and a display unit 14b. The control panel 14 is constituted from, for example, a touch panel system display. The operation unit 14a transmits an instruction received from a user to the CPU 11. The display unit 14b displays information for the user.

The timer 15 generates clock time information by clocking a time period. The clock time information generated by the timer 15 is acquired by the CPU 11.

The scanner 16 generates image data by reading an image from an original placed on an unillustrated document glass or an original fed by an unillustrated automatic document feeder. The printer 18 forms an image on a recording paper on the basis of the image data. The I/F chip 17 is used when input/output of data is carried out between the scanner 16 and the HDD 19, and the HDD 19 and the printer 18. Respective arrows a, b, and c shown in FIG. 1 show flows of the image data. The arrow a shows the flow of the image data when the image data generated at the scanner 16 is stored in the HDD 19 via the I/F chip 17. The arrow b shows the flow of the image data when the image data stored in the HDD 19 is outputted for printing to the printer 18. The arrow c shows a case of deleting the image data fetched for printing because there is no need to store it.

Figure 2:
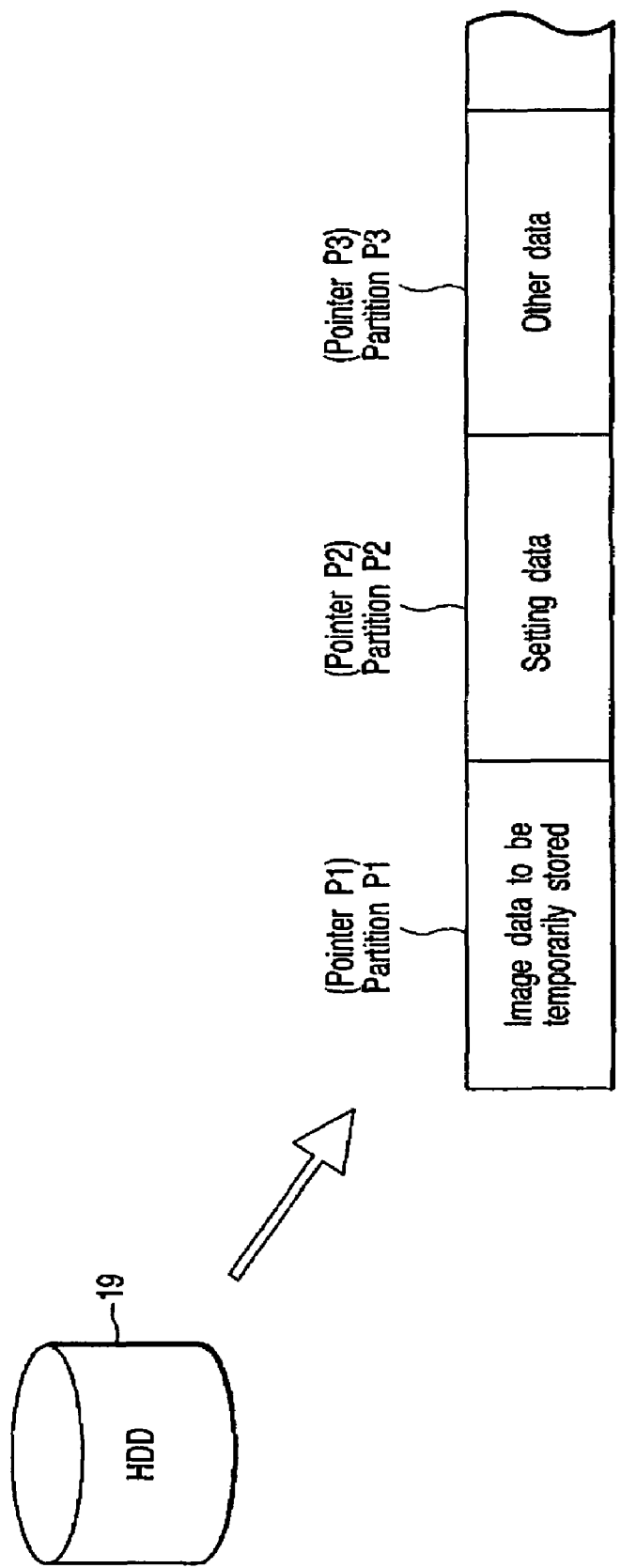
FIG. 2 is a diagram for explanation of a data storage region divided into a plurality of regions of an HDD in the embodiment.

The HDD 19 stores image data and various data. The various data are, for example, image data generated by the scanner 16, setting data in a confidential box by a user, and the like. Further, the data storage region of the HDD 19 is divided into a plurality of regions with partitions. FIG. 2 is a diagram for explanation of the data storage region of the HDD 19 divided into a plurality of regions. As shown in FIG. 2, with respect to the storage region of the HDD 19, the storage region is divided, such as, into partitions P1, P2, P3, .... The partitions P1, P2, P3, ... are specified such that predetermined data are respectively stored therein.

FIG. 3 is a table showing settings for pointers corresponding to the partitions stored in the nonvolatile RAM 13. A pointer shows which one of the partitions P1, P2, P3, ... a destination to store the data is, at the time of storing data in the HDD 19. For example, as shown in FIG. 3, when the pointer P1 is used as a pointer at the time of storing data, the data is stored in the partition P1.

In the first embodiment, as shown in FIG. 2, the partition P1 is set to be used in order to temporarily store image data generated by the scanner 16 at the time of executing copying. Further, in the partition P2, setting data by the user and the like are stored. In the partition P3 and the like, other data other than the data above are stored. Accordingly, the CPU 11 carries out the following processing at the time of storing data in the HDD 19. When the data is data to be temporarily stored in the HDD 19 in order to carry out copying, the CPU 11 stores the data, i.e., the image data generated by the scanner 16 into the partition P1 on the basis of the pointer P1. Further, when the data is setting data, the CPU 11 stores the data into the partition P2 on the basis of the pointer P2. Moreover, when the data is neither image data nor setting data, the CPU 11 sets a pointer corresponding to the data, and stores the data into a partition corresponding to the pointer.

Figure 4:
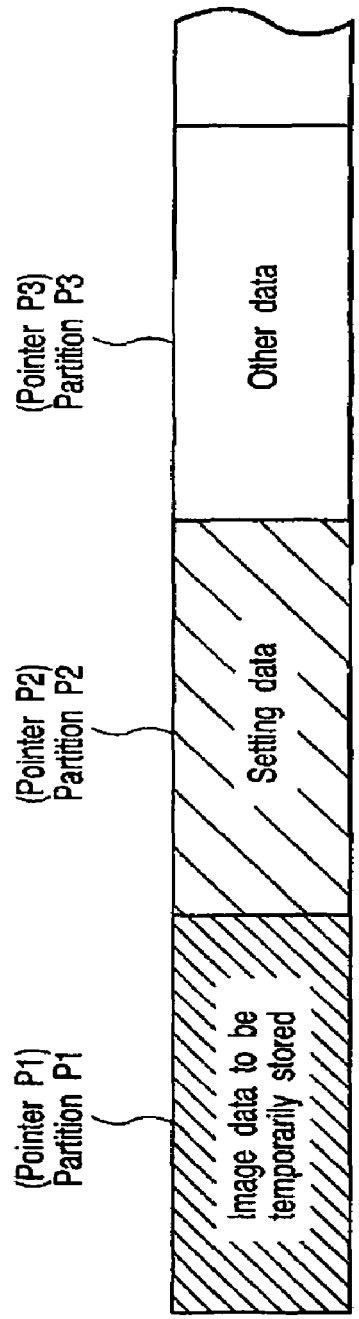
FIG. 4 is a diagram for conceptually explaining the progress of deterioration of the partitions when the HDD is used for a long period in the embodiment.

As described above, the copying machine 1 is configured to temporarily store the image data in the partition P1. Namely, as shown in FIG. 1, every time copying is carried out, the image data is stored in the HDD 19 (arrow a), and is fetched (arrow b) or deleted (arrow c). Therefore, a frequency in use of the partition P1 is extremely high. As compared therewith, a frequency in use of the partition P2 in which setting data that data in a confidential box and the like are set are stored is low. Accordingly, as the copying machine 1 is used over an extended period, in other words, as the HDD 19 is used over an extended period, the degrees of deterioration of the partition P1 and the partition P2 are made different from one another. Namely, a deterioration of the partition P1 is made to progress as compared with a deterioration of the partition P2. FIG. 4 is a diagram for conceptually explaining the progress of deterioration of the partitions when the HDD 19 has been used for an extended period. In FIG. 4, a status in which a deterioration of the partition P1 has been made to progress more than a deterioration of the partition P2 is shown.

Note that, in this way, a user can check a status of the HDD 19 in which various data are stored in the respective partitions. FIG. 5 is a diagram showing one example of a screen for checking a status of the HDD 19. This screen can be displayed on the display unit 14b by operating the operation unit 14a of the control panel 14 by the user. As shown in FIG. 5, various statuses of the HDD 19 are indicated by numeric values. Further, a status can be displayed in accordance with each partition. In the item of "Value", numeric values show how the statuses are. In the item of "Threshold", threshold values which are specified by default, or set by the user are set. As the values set as the threshold values, values at which possibilities that obstacles such as failures and the like are brought about in the HDD 19 increase are set. Note that, the technology of displaying the statuses of the HDD 19 is the same as that which has conventionally existed, detailed descriptions thereof will be omitted.

In the first embodiment, the statuses of the HDD 19 are displayed on the display unit 14b of the control panel 14. However, if the copying machine 1 has a function of connecting to a network, it is possible to display the statuses of the HDD 19 on a display unit of a PC connected to the network.

Figure 6:
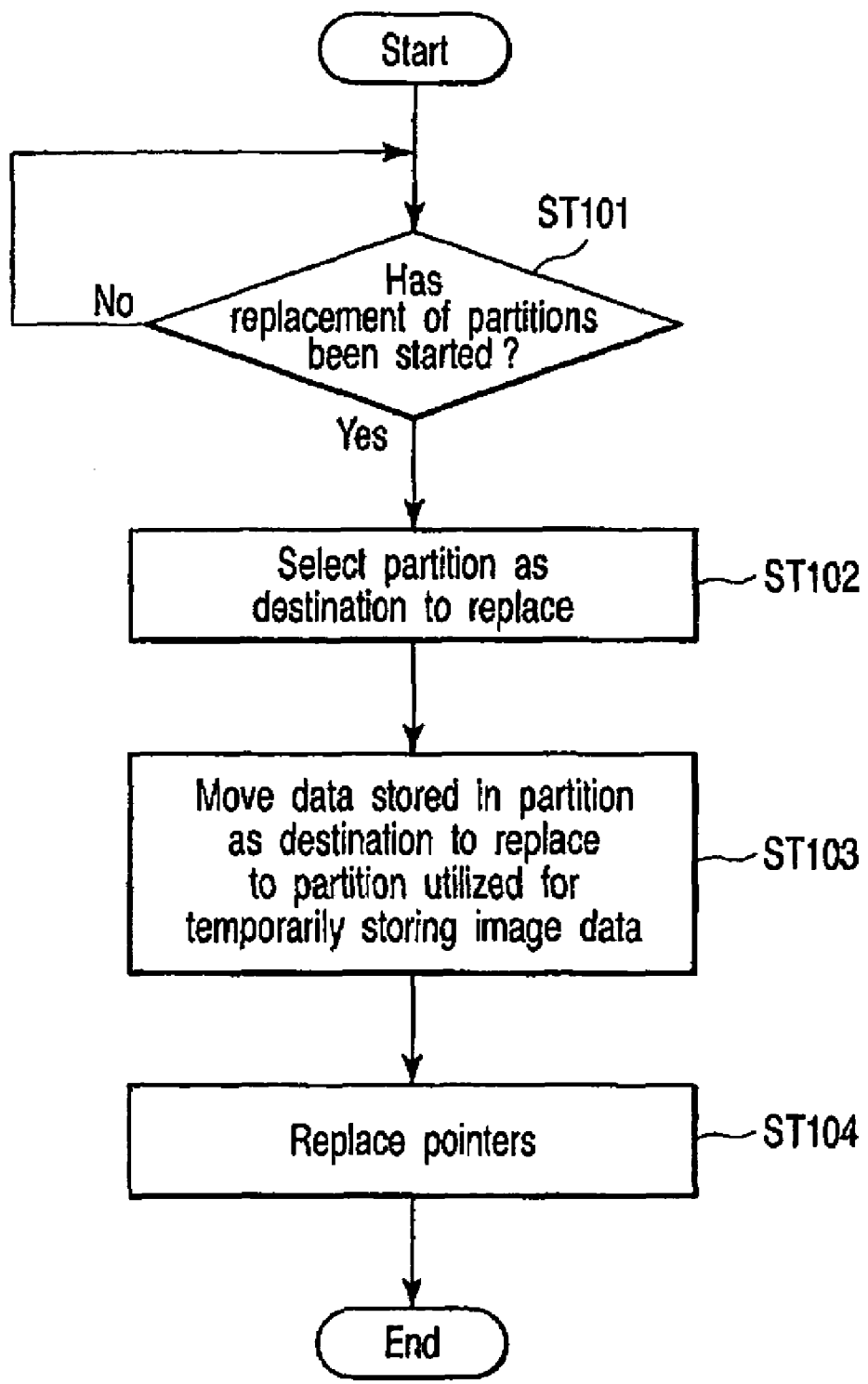
FIG. 6 is a flowchart showing a principal part of processing for replacing partitions in the embodiment.

Next, processing for replacing partitions in which the image data generated by the scanner 16 are temporarily stored will be described. FIG. 6 is a flowchart showing a principal part of the processing for replacing partitions.

The CPU 11 determines whether or not a replacement of partitions is started (ST101). This determination is determined on the basis of whether or not an instruction to replace partitions by an administrator of the copying machine 1 has been received from the operation unit 14a of the control panel 14.

When the CPU 11 determines that a replacement of partitions is to be started (YES in ST101), the CPU 11 selects a partition as a destination to replace from among the partitions other than a partition for temporarily storing image data which has been currently set (ST102). Then, the CPU 11 moves the data stored in the selected partition to a partition utilized for temporarily storing image data (ST103). For example, when a partition utilized for temporarily storing image data is P1, and the partition P2 is selected as a partition other than the partition P1, the CPU 11 moves the setting data stored in the partition P2 to the partition P1. Note that, the image data in the partition P1 may be overwritten with the setting data. This is because the image data temporarily stored in the partition P1 is data which might be deleted.

When the data movement is completed, the CPU 11 replaces the pointers of the partitions. In the example described above, the pointer P1 serving as a pointer for storing data in the partition P1 is replaced with the pointer P2, and the pointer P2 serving as a pointer for storing data in the partition P2 is replaced with the pointer P1. FIG. 7 is a table showing settings for the pointers after carrying out the processing for replacing pointers in this way. As compared with the table described in FIG. 3, a replacement of the pointer P1 and the pointer P2 has been carried out.

Next, the operation of the copying machine 1 configured as described above will be described. The administrator can check the statuses of the HDD 19 due to a display on the display unit 14b, for example, as shown in FIG. 5. In this way, when the fact that a deterioration of the partition P1 has been made to progress is observed on the basis of the statuses of the HDD 19 displayed, the administrator instructs to carry out a replacement of a partition utilized for temporarily storing image data by operating the operation unit 14*a*.

An instruction to replace partitions is issued in this way. In this case, after, for example, the partition P2 is selected as a partition utilized for temporarily storing image data, the setting data stored in the selected partition P2 is moved to the partition P1. Then, the pointer for storing data in the partition P1 and the pointer for storing the data in the partition P2 are replaced with one another. Namely, the pointer P1 serving as a pointer for storing data in the partition P1 is replaced with the pointer P2, and the pointer P2 serving as a pointer for storing data in the partition P2 is replaced with the pointer P1.

Figure 8:
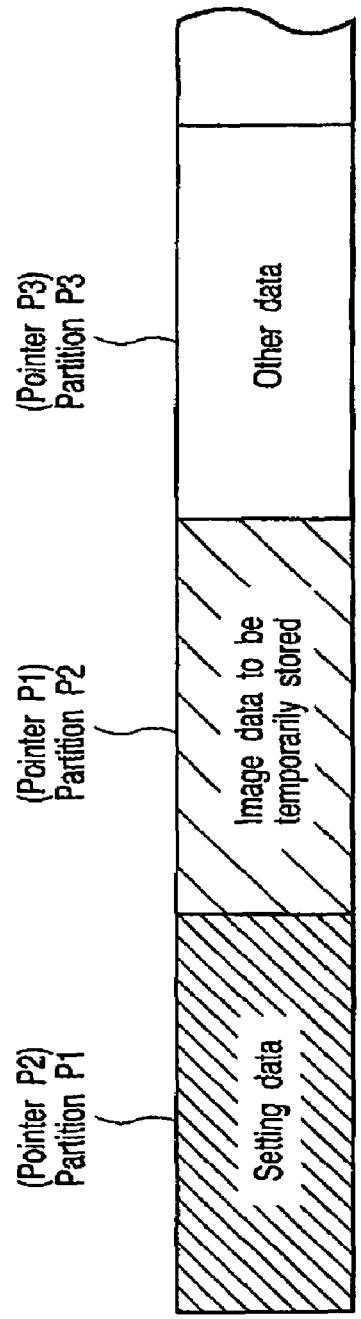
FIG. 8 is a diagram conceptually showing statuses of the regions of the HDD at which data are stored after carrying out replacing partitions in the embodiment.

FIG. 8 is a diagram conceptually showing the statuses of the regions at which the data of the HDD 19 are stored after carrying out a replacement of partitions. As shown in FIG. 8, in the partition P1, the setting data is stored, and the pointer for storing data in the partition P1 is the pointer P2. Further, in the partition P2, the image data is temporarily stored, and the pointer for storing data in the partition P2 is the pointer P1. Namely, in the status shown in FIG. 8, the pointer P1 and the pointer P2 are replaced with one another as compared with the status described in FIG. 4.

Accordingly, when copying is carried out after carrying out a replacement of partitions, the image data generated by the scanner 16 is temporarily stored in the partition P2 on the basis of the pointer P1. Namely, every time copying is carried out, as a partition used for temporarily storing image data, the partition P1 in which the progress of a deterioration is great, i.e., a frequency in use is high is replaced with the partition P2 in which a frequency in use is low.

Further, when the partition P2 has deteriorated, the copying machine 1 can replace the pointer P1 for storing data in the partition P2 with the pointer P3 for storing data in the partition P3 by carrying out substantially the same processing. Then, the image data generated by the scanner 16 is temporarily stored in the partition P3. In this way, by replacing partitions, there is no case in which only one partition is continued to overuse, and the frequencies in uses can be constant, which can extend the life of the HDD 19. In this way, it is possible to extend the life of the HDD 19, which results in preventing the data stored in the HDD 19 from being lost. Accordingly, an attempt can be made to extend the life of the HDD 19 of the copying machine 1, and to improve the reliability thereof.

Second Embodiment

Next, a second embodiment will be described. Note that portions which are the same as those in the first embodiment described above are denoted by the same reference numerals. The second embodiment is to possess or present indexes serving as targets for replacing partitions. Therefore, hereinafter, portions associated with a replacement of pointers will be described in detail, and descriptions of the other portions will be omitted.

Figure 9:
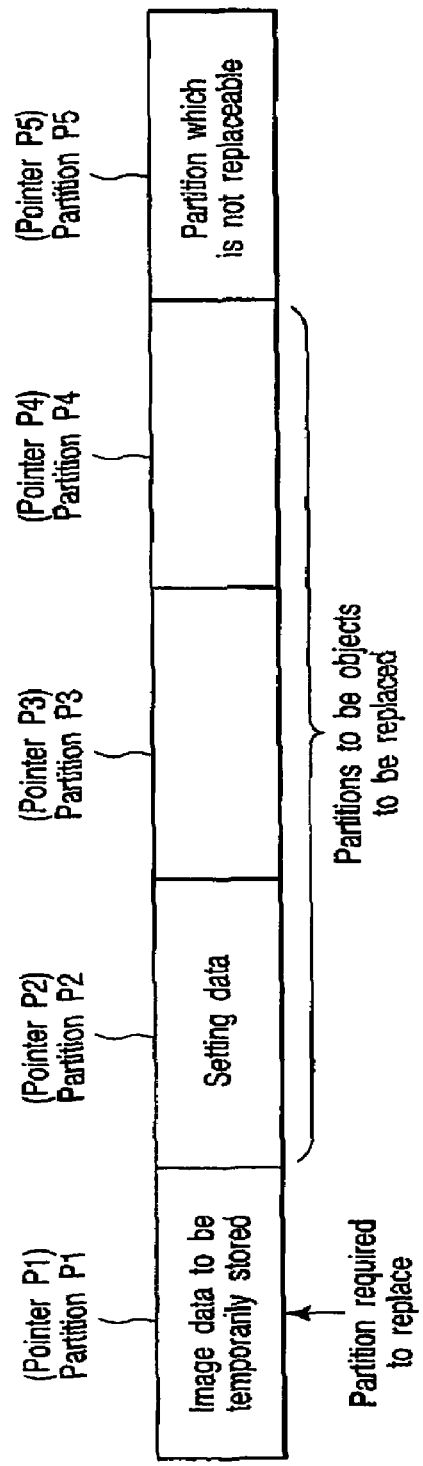
FIG. 9 is a diagram conceptually showing a constitution of partitions of an HDD in a second embodiment.

First, a constitution of the partitions of the HDD 19 will be described. FIG. 9 is a diagram conceptually showing the constitution of the partitions of the HDD 19 in the second embodiment. As shown in FIG. 9, the storage region of the HDD 19 is divided, such as, into partitions P1, P2, P3, P4, and P5. The partition P1 is used as a partition in which the image data generated by the scanner 16 is temporarily stored at the time of carrying out copying in the same way as the first embodiment. Further, the partitions P2, P3, and P4 may be objects to be replaced with the partition P1. However, the partition P5 is a partition which is not replaceable. The region at which data is stored of the partition P5 is a region which is much larger or much smaller than the region at which data is stored of the partition P1. When the region at which data is stored of the partition P5 is a region which is much smaller than the region at which data is stored of the partition P1, the region is unqualified for a region at which image data is temporarily stored. Further, when the region at which data is stored of the partition P5 is a region which is much larger than the region at which data is stored of the partition P1, the region is a storage region provided with another intention in place of an intention to temporarily store the image data. In accordance with such reasons, the partition P5 is set as a partition which is not replaceable.

Indexes are provided with respect to the partitions P1, P2, P3, and P4. FIG. 10 is a table showing settings for indexes and pointers provided so as to correspond to the partitions. An index shows a number of times that the a partition is used as a region at which the image data generated by the scanner 16 is temporarily stored. As shown in FIG. 10, the indexes with respect to the respective partitions are set to 0 as the initial values. Note that, with respect to the partition P5, an index is not provided. This is because an index is used at the time of selecting a replaceable partition. This table is managed at, for example, the nonvolatile RAM 13.

Figure 11:
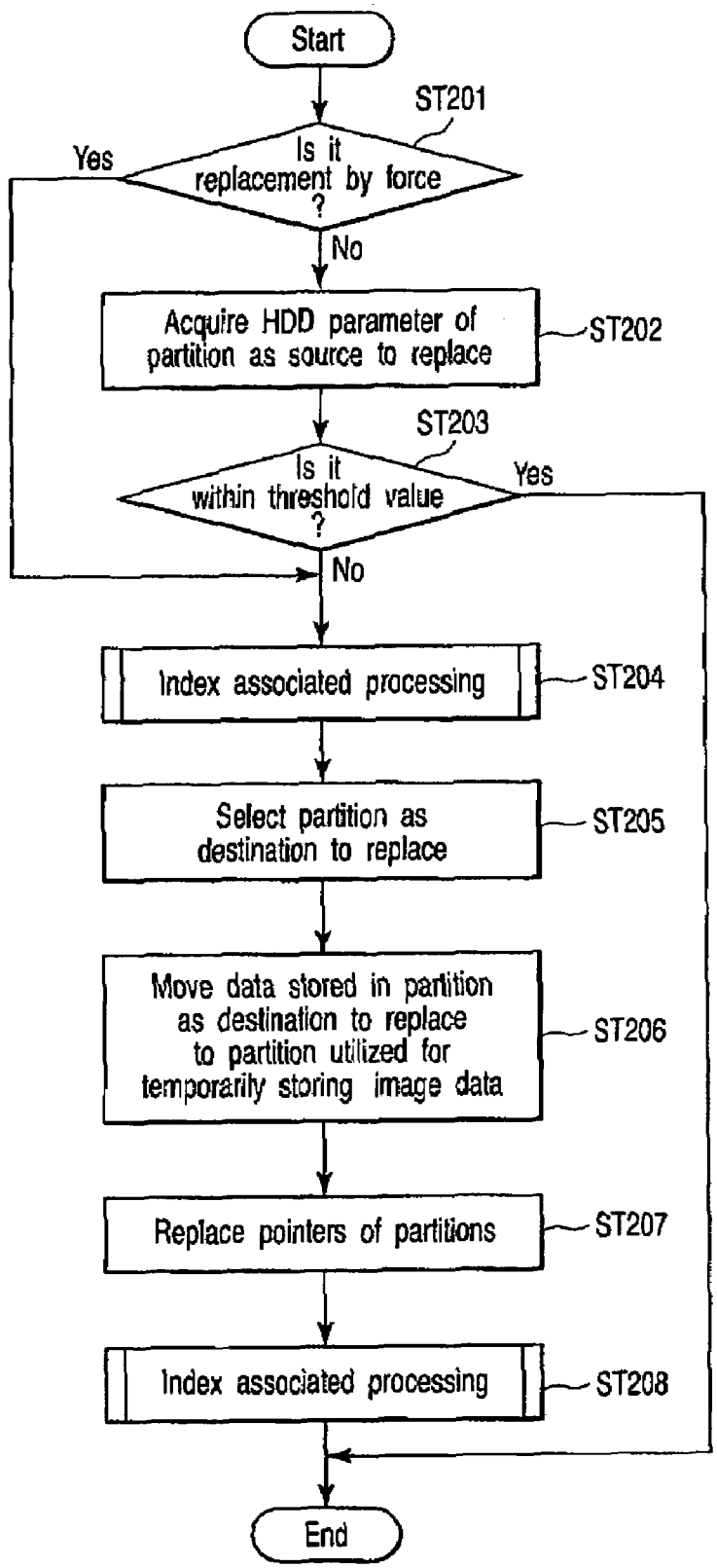
FIG. 11 is a flowchart showing a principal part of processing for replacing partitions in the embodiment.

Next, processing for replacing partitions will be described. FIG. 11 is a flowchart showing a principal part of the processing for replacing partitions.

First, the CPU 11 determines whether or not a replacement of partitions is a replacement by force (ST201). This determination is determined on the basis of whether or not an instruction to replace partitions by the administrator of the copying machine 1 is received from the operation unit 14*a* of the control panel 14. Note that a case in which it is not a replacement by force is, for example, a case whose details will be described in a third embodiment, and in which processing for replacing partitions is started when it is determined that a predetermined time has passed. When the CPU 11 determines that it is a replacement by force (YES in ST201), the CPU 11 skips over the processings in steps ST202 and ST203 which will be described later.

When it is determined that it is not a replacement by force in this determination (YES in ST201), the CPU 11 accesses to parameter information which the HDD 19 provides, and acquires an HDD 19 parameter of a partition which is a source to replace. The partition which is a source to replace is a partition used for temporarily storing image data (ST202). As the HDD 19 parameters, information showing the statuses of the HDD 19 as described with reference to FIG. 5 are acquired. In this way, after the CPU 11 acquires the HDD 19 parameter of the partition which is a source to replace, the CPU 11 determines whether or not the HDD 19 parameter is within a threshold value by comparing the acquired HDD 19 parameter and the threshold value (ST203). The threshold value is, for example, as described in the first embodiment, set by default or by a user to a value at which there is a possibility that an obstacle is brought about in the HDD 19. When the CPU 11 determines that the acquired HDD 19 parameter is within the threshold value (YES in ST203), the CPU 11 completes the processing without carrying out processing for replacing partitions. This is because the partition used for temporarily storing image data is still available.

On the other hand, when the CPU 11 determines that the acquired HDD 19 parameter is not within the threshold (NO in ST203), or when the CPU 11 determines that partitions are to be replaced by force (YES in ST201), the CPU 11 executes index associated processing (ST204).

Figure 12:
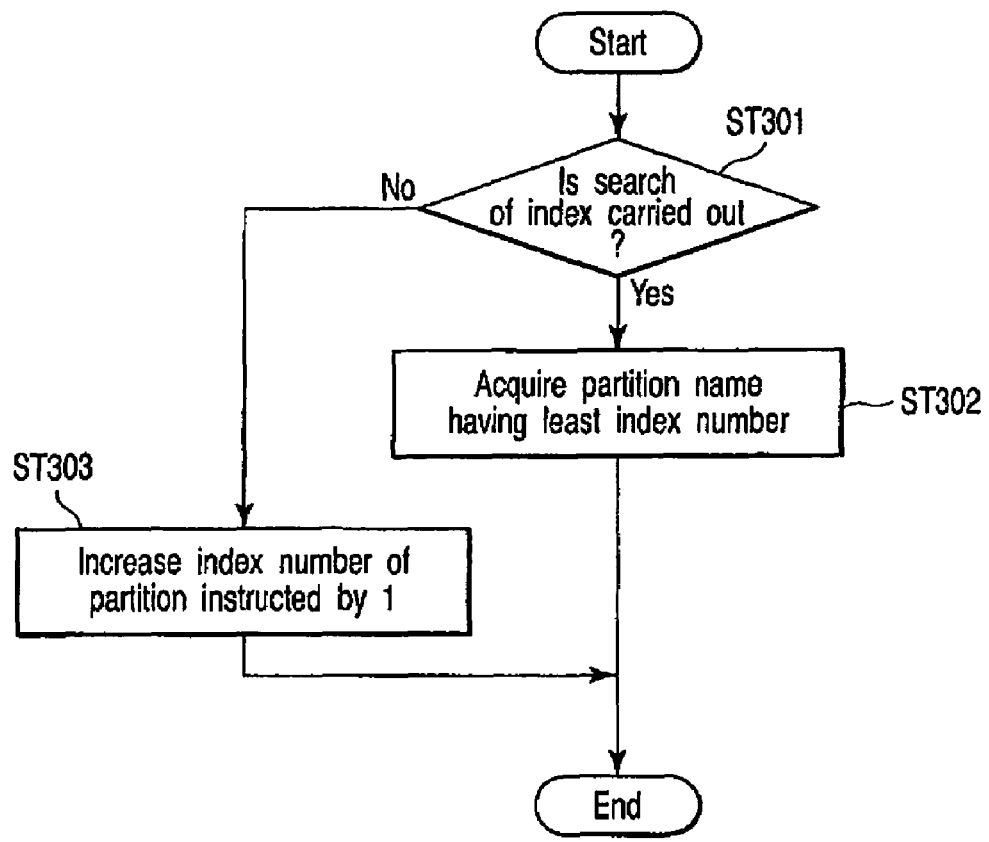
FIG. 12 is a flowchart showing index associated processing in the embodiment.

This index associated processing will be described with reference to FIG. 12. FIG. 12 is a flowchart showing the index associated processing.

First, the CPU 11 determines whether or not a search of an index is carried out (ST301). When a replacement of partitions is carried out (NO in ST203 or YES in step ST201), it is determined that a search of an index is carried out. When the CPU 11 determines that a search of an index is carried out (YES in step ST301), the CPU 11 acquires a partition name having a smallest index number from among indexes set in the replaceable partitions with reference to the table described in FIG. 10 (ST302). To describe concretely, the partition P1 is set as a region at which image data is temporarily stored, and the partition P5 is a partition which is not replaceable. Further, all the index numbers corresponding to the partitions P2, P3, and P4 are set to "0" which is the initial value. Therefore, the partitions P2, P3, and P4 are acquired as replaceable partition names. In this way, when the partitions to be objects to be replaced are acquired, the CPU 11 completes the processing. Note that a case of NO in step ST301 will be described later after describing the following step ST207.

Next, the CPU 11 determines the acquired partitions to be objects to be replaced, as partitions as a destination to replace. Note that, when a plurality of partitions have been acquired, an arbitrary partition, for example, the partition P2 is selected from among the plurality of partitions (ST205).

In this way, when the CPU 11 determines a partition as a destination to replace, the CPU 11 moves data stored in the determined partition to a partition utilized for temporarily storing image data (ST206). Next, the CPU 11 carries out a replacement of pointers after moving the data (ST207). Because the processings for moving data and for replacing pointers are respectively substantially the same as those in the cases in steps ST103 and ST104 described in the first embodiment, detailed descriptions thereof will be omitted.

Next, the CPU 11 carries out index associated processing again (ST208). As shown in FIG. 12, the CPU 11 determines whether or not a search of an index is carried out (ST301). After carrying out processing for replacing pointers, it is determined that a search of an index is not carried out. When the CPU 11 determines that a search of an index is not carried out (NO in ST301), the CPU 11 adds 1 to an index of a partition which is a source to replace, i.e., a partition utilized for temporarily storing image data (ST303). FIG. 13 is a table showing settings for indexes and pointers provided so as to correspond to the partitions when 1 is added to an index set in a partition which is a source to replace. As the index of the partition P1 which is a partition which is a source to replace increases from "0" to "1", as compared with the case in FIG. 10, the pointer P1 and the pointer P2 are replaced.

Next, the operation in a case in which the administrator instructs to carry out a replacement of a partition utilized for temporarily storing image data by the operation unit 14a in the copying machine 1 constituted as described above will be described.

When an instruction to replace partitions is issued, the partition P2 is selected as a partition utilized for temporarily storing image data from among the partitions P2, P3, and P4, on the basis of the indexes set so as to correspond to the partitions. Then, the setting data stored in the selected partition P2 is moved to the partition P1. Then, the pointer for storing data in the partition P1 is replaced with the pointer for storing data in the partition P2. Namely, the pointer for storing data in the partition P1 is switched from the pointer P1 to the pointer P2, and the pointer for storing data in the partition P2 is switched from the pointer P2 to the pointer P1. Moreover, the index number of the index set in the partition P1 is switched from "0" to "1".

Figure 14:
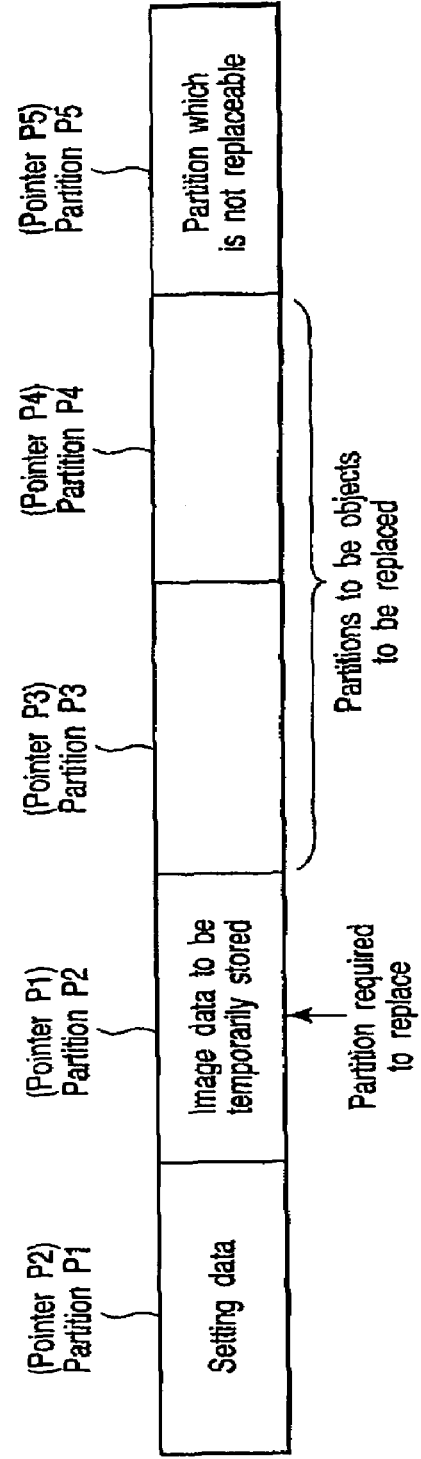
FIG. 14 is a diagram conceptually showing statuses of the regions of the HDD at which data are stored after carrying out replacing partitions in the embodiment.

FIG. 14 is a diagram conceptually showing the statuses of the regions at which the data of the HDD 19 are stored after carrying out a replacement of partitions. As shown in FIG. 14, the setting data is stored in the partition P1, and the pointer for storing data in the partition P1 is the pointer P2. Further, the image data is temporarily stored in the partition P2, and the pointer for storing data in the partition P2 is the pointer P1. Namely, in the status shown in FIG. 14, the pointer P1 and the pointer P2 are replaced as compared with the status described in FIG. 9.

Accordingly, when copying is carried out after carrying out a replacement of partitions in the same way as in the first embodiment, the image data generated by the scanner 16 is temporarily stored in the partition P2 on the basis of the pointer P1. Namely, as a partition used for temporarily storing image data for every copying, the partition P1 in which the progress of a deterioration is great, i.e., a frequency in use is high is replaced with the partition P2 in which a frequency in use is low.

Further, when the partition P2 has deteriorated, the copying machine 1 can replace the pointer P1 for storing data in the partition P2 with another pointer by carrying out substantially the same processing. The other pointer is a pointer for storing data in a partition selected from the partitions P3 and P4 on the basis of an index. In this way, when a partition is exchanged in a case in which the partition P2 has deteriorated, the partition P1 whose index number is "1" is not selected, and a partition is selected from the partitions P3 and P4 whose index numbers are "0". For example, when the partition P3 is selected, the image data generated by the scanner 16 is temporarily stored in the partition P3. In this way, by replacing partitions for temporarily storing image data except for the partition P5 which is not replaceable, there is no case in which only one partition is continued to overuse, and the frequencies in uses of partitions can be constant, which can extend the life of the HDD 19. Consequently, it is possible to extend the life of the HDD 19, which results in preventing the data stored in the HDD 19 from being lost.

Note that, the case in which the partition P5 which cannot used for temporarily storing image data is provided in the HDD 19 is described in the second embodiment. However, the partition P5 may be not provided therein.

Third Embodiment

Next, a third embodiment will be described. Portions which are the same as those in the second embodiment described above are denoted by the same reference numerals. The third embodiment is a case in which processing for replacing partitions is carried out when a predetermined time has passed. Therefore, the constitution for determining whether or not a predetermined time has passed will be described in detail, and other descriptions will be omitted.

Figure 15:
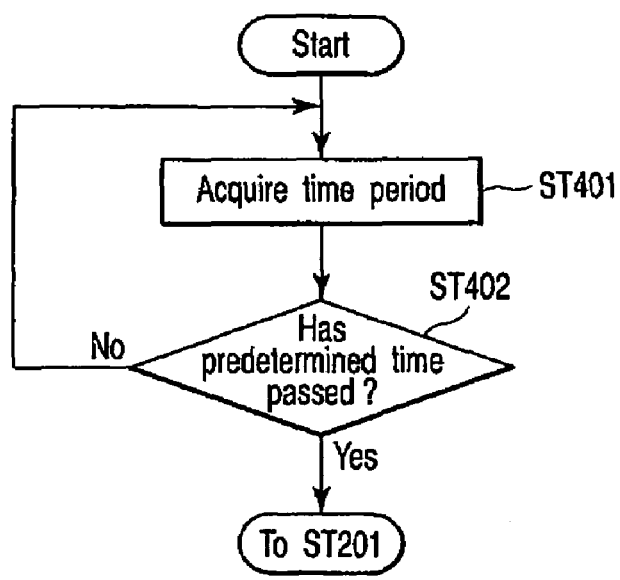
FIG. 15 is a flowchart showing processing for determining whether or not a predetermined time has passed in a third embodiment.

FIG. 15 is a flowchart showing processing for determining whether or not a predetermined time has passed. The CPU 11 acquires clock time information clocked by the timer 15 (ST401), and the CPU 11 determines whether or not a clock time shown by the clock time information has passed over a predetermined time (ST402). The predetermined time is a periodic time period determined in advance, for example, such as 8 a.m. on Saturday. The administrator sets this periodic time period in, for example, the nonvolatile RAM 13 by operating the operation unit 14a. When the CPU 11 determines that a predetermined time has not passed (NO in ST401), the CPU 11 carries out the processing in step ST401 again. When the CPU 11 determines that a predetermined time has passed (YES in ST401), the routine proceeds to the processing in step ST301 described in the second embodiment. Because the following processings are the same as those in the case of the second embodiment, descriptions thereof will be omitted.

Accordingly, the copying machine 1 automatically carries out processing for replacing partitions when a predetermined time set in advance has passed. Because a replacement of the partition with another partition is automatically carried out when a frequency in use of a certain partition is high by setting as described above by the administrator, the convenience can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and equivalents thereof.

What is claimed is:

1. An image forming apparatus comprising:
   a scanner;
   a hard disk drive in which a region at which data is stored is divided into a plurality of regions by partitions;
   a pointer setting unit in which a first pointer used for storing image data generated on the basis of an image read by the scanner at one region of said plurality of regions, and a plurality of second pointers which are provided so as to correspond to the regions other than the one region in order to store data other than the image data at the regions other than the one region, are set;
   a pointer replacing unit configured to replace the first pointer with one of said plurality of second pointers at predetermined timings;
   an index number storage unit which stores an index number for each of said plurality of regions at which the data of the hard disk drive are stored; and
   an index number increasing unit configured to increase an index number corresponding to a region at which the image data has been stored using the first pointer after the first pointer is replaced with one of said plurality of second pointers,
   wherein the second pointer that is to replace the first pointer is selected from one or more of the second pointers corresponding to those regions whose index numbers are the smallest.

2. The apparatus claim 1, wherein
   when data is stored at a region corresponding to the second pointer that replaces the first pointer, the data is moved to a region at which the image data has been stored using the first pointer.

3. The apparatus of claim 2, wherein the movement of the data is overwriting data.

4. The image apparatus of claim 1, further comprising:
   a display unit;
   a status display unit configured to display statuses of the regions of the hard disk drive for predetermined items on the display unit; and
   a threshold value setting unit configured to set threshold values in accordance with the predetermined items, wherein
   the predetermined timings are moments exceeding threshold values set in the threshold value setting unit.

5. The apparatus of claim 1, wherein
   an image data storage not-replaceable region at which the image data cannot be stored is one of the regions other than the one region, and
   at the time of carrying out a replacement of the first pointer, the pointer replacing unit excepts a second pointer corresponding to the image data storage not-replaceable region from second pointers that can be selected to replace the first pointer.

6. The apparatus of claim 1, further comprising
   a timer to clock a time period, wherein
   the predetermined timings are moments when a time period clocked by the timer has passed over a clock time set in advance.

7. A method for replacing a region at which image data of an image forming apparatus having a scanner and a hard disk drive is stored, comprising:
   generating image data on the basis of an image read by the scanner;
   storing the generated image data at one region of a plurality of regions provided in the hard disk by partitions in accordance with a first pointer; and
   replacing the first pointer with one of a plurality of second pointers which are provided so as to correspond to the regions other than the one region in order to store data at the regions other than the one region at predetermined timings; and
   increasing an index number corresponding to a region at which the image data has been stored using the first pointer after the first pointer is replaced with one of said plurality of second pointers,
   wherein the second pointer that replaces the first pointer is selected from one or more of the second pointers corresponding to those regions whose index numbers are the smallest.

8. The method claim 7, wherein the predetermined timings are moments exceeding threshold values set in accordance with predetermined items of statuses of the regions of the hard disk drive.

9. The method of claim 7, further comprising
   moving data to a region at which the image data has been stored by the first pointer when the data is stored at a region corresponding to the second pointer that replaces the first pointer.

10. A method for replacing a region at which image data of an image forming apparatus having a scanner and a hard disk drive is stored, comprising:
    generating image data on the basis of an image;
    storing the generated image data at one region of a plurality of regions provided in the hard disk by partitions in accordance with a first pointer;
    setting a first pointer used for storing the generated image data at one region of said plurality of regions, and setting a plurality of second pointers which are provided so as to correspond to the regions other than the one region in order to store data other than the image data at the regions other than the one region;
    replacing the first pointer with one of said plurality of second pointers at predetermined timings;
    storing an index number for each of said plurality of regions; and increasing an index number corresponding to a region at which the image data has been stored using the first pointer after the first pointer is replaced with one of said plurality of second pointers, wherein the second pointer that replaces the first pointer is selected from one or more of the second pointers corresponding to those regions whose index numbers are the smallest.

11. The method of claim 10, wherein the predetermined timings are moments exceeding threshold values set in accordance with predetermined items of the statuses of the regions.

12. The method of claim 10, further comprising:

moving data to a region at which the image data has been stored by the first pointer when the data is stored at a region corresponding to the second pointer that replaces the first pointer.

13. The method of claim 10, wherein the first pointer is replaced with one of a plurality of second pointers at moments when a time period clocked by a timer has passed over a clock time set in advance.

* * * * *